(12) United States Patent
Gandikota et al.

(10) Patent No.: US 11,280,495 B2
(45) Date of Patent: Mar. 22, 2022

(54) GAS TURBINE COMBUSTOR FUEL INJECTOR FLOW DEVICE INCLUDING VANES

(71) Applicant: General Electric Company, Schenectady, NY (US)

(72) Inventors: Gurunath Gandikota, Bangalore (IN); Steven Clayton Vise, Loveland, OH (US); Perumallu Vukanti, Bangalore (IN); Mayank Krisna Amble, Bangalore (IN); Clayton Stuart Cooper, Loveland, OH (US); Nicholas Ryan Overman, Sharonville, OH (US); Karthikeyan Sampath, Bangalore (IN); Allen Michael Danis, Mason, OH (US); Craig Douglas Young, Blanchester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/808,443

(22) Filed: Mar. 4, 2020

(65) Prior Publication Data
US 2021/0278085 A1 Sep. 9, 2021

(51) Int. Cl.
| *F23R 3/14* | (2006.01) |
| *F23R 3/28* | (2006.01) |
| *F23R 3/00* | (2006.01) |
| *F02C 7/22* | (2006.01) |

(52) U.S. Cl.
CPC ............... *F23R 3/286* (2013.01); *F23R 3/14* (2013.01); *F02C 7/22* (2013.01); *F05D 2240/35* (2013.01); *F23R 3/002* (2013.01)

(58) Field of Classification Search
CPC .................................. F23R 3/14; F23R 3/286
See application file for complete search history.

(56) References Cited

U.S. PATENT DOCUMENTS

| 3,618,317 | A | * | 11/1971 | Du Bell | F23R 3/14 60/737 |
| 5,394,688 | A | * | 3/1995 | Amos | F23C 7/006 60/39.23 |
| 5,603,211 | A | * | 2/1997 | Graves | F23C 7/002 60/39.48 |
| 5,941,075 | A | * | 8/1999 | Ansart | F23R 3/14 60/748 |
| 6,035,645 | A | * | 3/2000 | Bensaadi | F23R 3/14 60/742 |
| 6,442,940 | B1 | * | 9/2002 | Young | F23R 3/14 29/890.01 |

(Continued)

*Primary Examiner* — William H Rodriguez
(74) *Attorney, Agent, or Firm* — Venable LLP; Jacqueline A. DiRamio; Michele V. Frank

(57) ABSTRACT

A flow device for a combustor assembly defining a longitudinal axis around which the flow device is positioned is provided. The flow device includes a body extended around the longitudinal axis. The body includes a first wall and a second wall separated longitudinally from one another along the longitudinal axis. A fuel injector passage is defined through the body coaxial to the longitudinal axis. A plurality of vane walls is extended radially between the first wall and the second wall relative to the longitudinal axis. A radial flow passage is extended between the plurality of vane walls and the fuel injector passage.

17 Claims, 9 Drawing Sheets

(56) References Cited

U.S. PATENT DOCUMENTS

| | | | |
|---|---|---|---|
| 7,703,288 B2 | 4/2010 | Rogers | |
| 8,113,002 B2 | 2/2012 | Lacy et al. | |
| 8,590,312 B2 | 11/2013 | Sandelis | |
| 8,602,728 B2 | 12/2013 | Swiatek et al. | |
| 8,661,779 B2 | 3/2014 | Laster et al. | |
| 8,678,301 B2 | 3/2014 | Hubbard | |
| 8,806,848 B2 | 8/2014 | Koizumi et al. | |
| 9,052,114 B1 | 6/2015 | Toqan et al. | |
| 9,222,666 B2 | 12/2015 | Liu | |
| 9,404,656 B2 | 8/2016 | Burd | |
| 10,082,294 B2 | 9/2018 | Laster et al. | |
| 2003/0061815 A1* | 4/2003 | Young | B23P 6/00 60/748 |
| 2006/0207258 A1* | 9/2006 | Tanner | F16L 27/08 60/748 |
| 2007/0269757 A1* | 11/2007 | Commaret | F23R 3/286 431/265 |
| 2009/0142716 A1* | 6/2009 | Jubb | F23R 3/14 431/9 |
| 2009/0272117 A1* | 11/2009 | Wilbraham | F23R 3/14 60/748 |
| 2010/0074757 A1* | 3/2010 | Headland | F23R 3/286 416/227 R |
| 2010/0126176 A1* | 5/2010 | Kim | F23R 3/14 60/748 |
| 2010/0275602 A1* | 11/2010 | Cant | F23C 7/004 60/737 |
| 2011/0138815 A1* | 6/2011 | Headland | F23R 3/14 60/772 |
| 2012/0042655 A1* | 2/2012 | Lam | F23C 7/004 60/737 |
| 2014/0097276 A1* | 4/2014 | Boardman | F23D 11/105 239/589 |
| 2014/0190170 A1* | 7/2014 | Cai | F23R 3/286 60/746 |
| 2016/0305666 A1* | 10/2016 | Bulat | F23R 3/286 |
| 2017/0009994 A1* | 1/2017 | Buchanan | F23R 3/286 |
| 2017/0051919 A1* | 2/2017 | Dolmansley | F23C 7/002 |
| 2017/0298875 A1* | 10/2017 | Patel | F02M 61/14 |
| 2017/0299190 A1* | 10/2017 | Patel | F23R 3/286 |
| 2018/0045414 A1* | 2/2018 | Sadasivuni | F23R 3/14 |
| 2018/0187891 A1 | 7/2018 | Mitani et al. | |
| 2019/0024896 A1* | 1/2019 | Porter | F23R 3/14 |
| 2019/0086088 A1* | 3/2019 | Stevens | F23R 3/50 |
| 2019/0195499 A1* | 6/2019 | Dolmansley | F23R 3/14 |
| 2019/0257521 A1* | 8/2019 | Sadasivuni | F02C 7/22 |
| 2020/0182466 A1* | 6/2020 | Sadasivuni | F23R 3/14 |

\* cited by examiner

US 11,280,495 B2

GAS TURBINE COMBUSTOR FUEL INJECTOR FLOW DEVICE INCLUDING VANES

FIELD

The present subject matter relates generally to flow devices for combustor and fuel injector assemblies for mitigating undesired combustion dynamics.

BACKGROUND

Combustion dynamics is a significant challenge in designing for combustion sections, including rich burn combustion sections. Undesired combustion dynamics may result from certain heat release characteristics during the combustion process in heat engines, such as gas turbine engines. Combustion dynamics include acoustics, vibrations, and pressure oscillations that may accelerate deterioration and wear of combustion section components, such as fuel injectors, swirlers, liners, or dome assemblies. The accelerated deterioration and wear may lead to increased maintenance, and costs associated therewith, and/or reduced operating efficiencies, reduced engine operability margin, or increased risk of component or engine failure.

However, flow devices utilized for fuel/air mixing are sensitive to changes that may adversely affect combustion dynamics or mixing properties. As such, there is a need for flow devices for combustion assemblies that may mitigate undesired combustion dynamics and minimize adverse effects to fuel/air mixing assemblies.

BRIEF DESCRIPTION

Aspects and advantages of the invention will be set forth in part in the following description, or may be obvious from the description, or may be learned through practice of the invention.

A flow device for a combustor assembly defining a longitudinal axis around which the flow device is positioned is provided. The flow device includes a body extended around the longitudinal axis. The body includes a first wall and a second wall separated longitudinally from one another along the longitudinal axis. A fuel injector passage is defined through the body coaxial to the longitudinal axis. A plurality of vane walls is extended radially between the first wall and the second wall relative to the longitudinal axis. A radial flow passage is extended between the plurality of vane walls and the fuel injector passage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
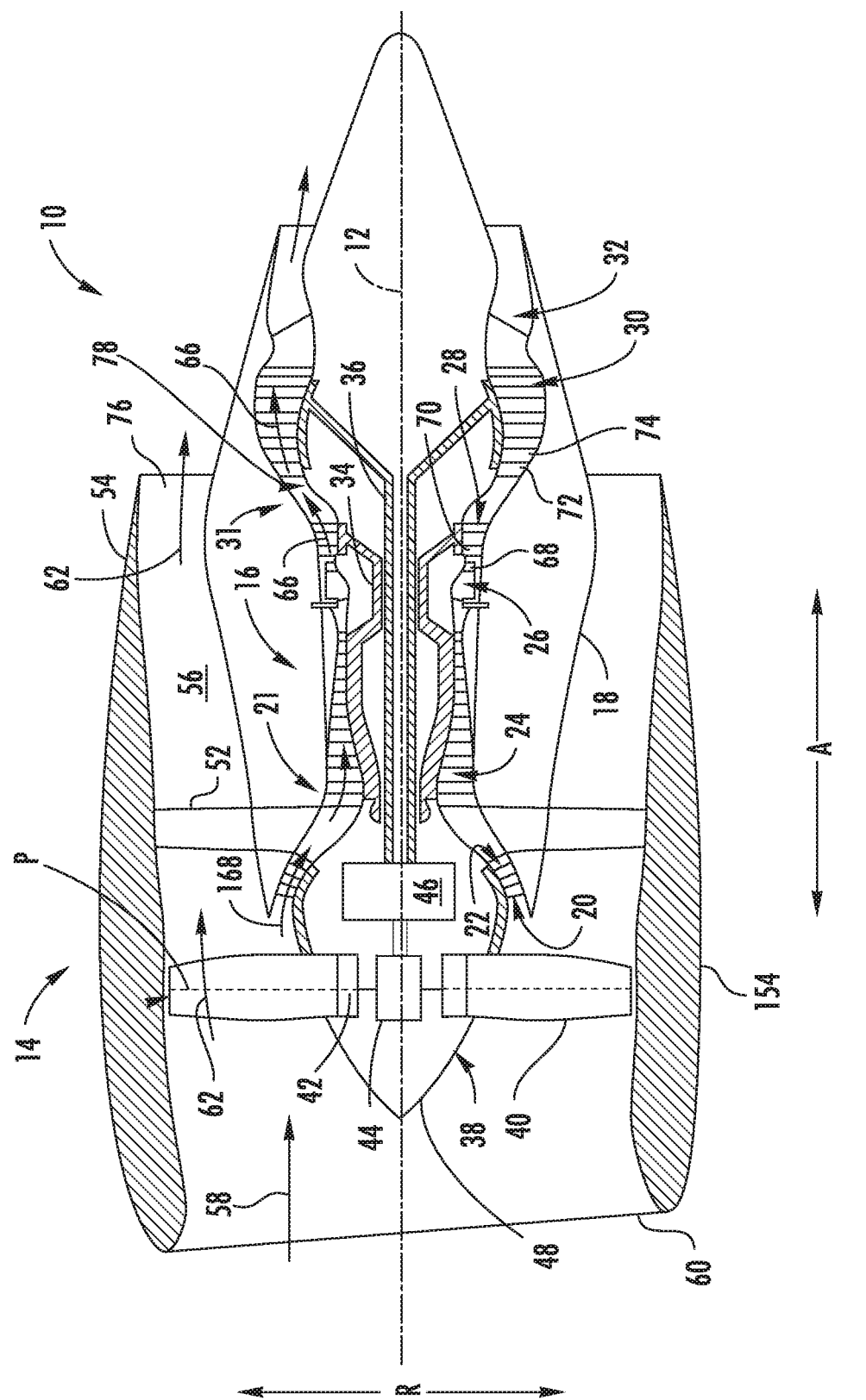
FIG. 1 is an exemplary schematic view of a heat engine including a flow device according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of flow devices for combustion assemblies that may mitigate undesired combustion dynamics and minimize adverse effects to fuel/air mixing assemblies are shown and described herein. The flow devices provided herein are included with a mixer assembly surrounding a fuel injector such as to provide a flow of fluid upstream of the mixer assembly such as to desirably mitigate combustion dynamics in combustor assemblies generally, or rich burn combustor assemblies particularly. The flow of fluid is introduced to a fuel injector passage via a plurality of radial vane walls positioned upstream of a mixer assembly configured to mitigate unsteady flow features, hydrodynamic instability modes, axial modes of pressure oscillations, and axial motion of a combustion recirculation zone. The flow devices provided herein may mitigate combustion dynamics in heat engines such as to improve component durability, reduce deterioration and wear, improve maintenance costs and engine operation, and mitigate losses in combustion or engine operability.

Referring now to the drawings, wherein identical numerals indicate the same elements throughout the figures, FIG. 1 is a schematic cross-sectional view of a turbo machine in accordance with an exemplary embodiment of the present disclosure. More particularly, for the embodiment of FIG. 1, the turbo machine defines a gas turbine engine 10, referred to herein as "engine 10." As shown in FIG. 1, the engine 10 defines an axial direction A (extending parallel to a longitudinal centerline 12 provided for reference) and a radial direction R.

In general, the engine 10 includes a fan section 14 and a core engine 16 disposed downstream from the fan section 14. The exemplary core engine 16 depicted generally includes a substantially tubular outer casing 18 that defines an annular inlet 20. The outer casing 18 encases, in serial flow relationship, a compressor section 21 including a booster or low pressure (LP) compressor 22 and a high pressure (HP) compressor 24; a combustion section 26; a turbine section 31 including a high pressure (HP) turbine 28 and a low pressure (LP) turbine 30; and a jet exhaust nozzle section 32. A high pressure (HP) shaft 34 drivingly connects the HP turbine 28 to the HP compressor 24, together defining a HP spool. A low pressure (LP) shaft drivingly connects the LP turbine 30 to the LP compressor 22, together defining an LP spool. It should be appreciated that other embodiments of the engine 10 not depicted may further an intermediate pressure (IP) spool defined by an IP compressor drivingly connected to an IP turbine via an IP shaft, in which the IP spool is disposed in serial flow relationship between the LP spool and the HP spool.

For the embodiment depicted, the fan section 14 includes a variable pitch fan 38 having a plurality of fan blades 40 coupled to a disk 42 in a spaced apart manner. As depicted, the fan blades 40 extend outwardly from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear assembly 46. The power gear assembly 46 includes a plurality of gears for providing a different rotational speed of the fan section 14 relative to the LP shaft 36, such as to enable a more efficient fan speed and/or LP spool rotational speed.

Referring still to the exemplary embodiment of FIG. 1, the disk 42 is covered by rotatable spinner cap 48 aerodynamically contoured to promote an airflow through the plurality of fan blades 40. Additionally, the exemplary fan section 14 includes a fan casing or outer nacelle 154 that circumferentially surrounds the fan 38 and/or at least a portion of the core engine 16. It should be appreciated that the nacelle 154 may be configured to be supported relative to the core engine 16 by a plurality of circumferentially-spaced outlet guide vanes 52. Moreover, a downstream section 54 of the nacelle 154 may extend over an outer portion of the core engine 16 so as to define a bypass airflow passage 56 therebetween.

During operation of the engine 10, a volume of air 58 enters the engine 10 through an associated inlet 60 of the nacelle 154 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 168 is directed or routed into the LP compressor 22. The ratio between the first portion of air 62 and the second portion of air 168 is commonly known as a bypass ratio. The pressure of the second portion of air 168 is then increased as it is routed through the high pressure (HP) compressor 24 and into the combustion section 26, where it is mixed with a liquid and/or gaseous fuel and burned to produce combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the engine 10, also providing propulsive thrust. The HP turbine 28, the LP turbine 30, and the jet exhaust nozzle section 32 at least partially define a hot gas path 78 for routing the combustion gases 66 through the core engine 16.

It should be appreciated, however, that the exemplary engine 10 depicted in FIG. 1 is by way of example only, and that in other exemplary embodiments, the engine 10 may have any other suitable configuration, such as, but not limited to, turbofan, turboprop, turboshaft, turbojet, or propfan configurations for aviation, marine, or power generation purposes. Still further, other suitable configurations may include steam turbine engines or other Brayton cycle machines.

Figure 2:
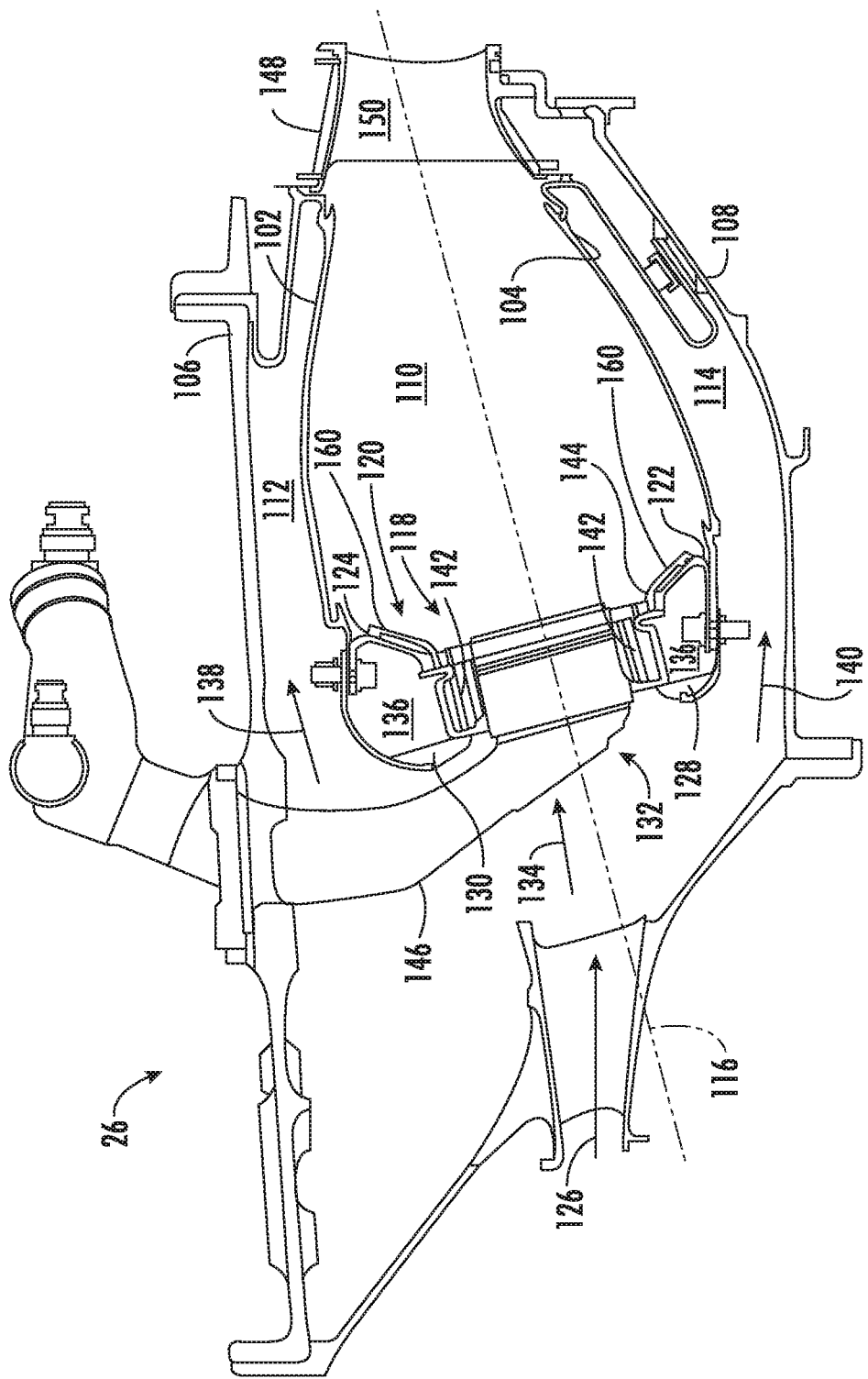
FIG. 2 is an exemplary schematic view of a combustion section of the heat engine of FIG. 1 including embodiments of the flow device according to aspects of the present disclosure.

Referring now to FIG. 2, a schematic cross-sectional view of one exemplary embodiment of a combustion section 26 suitable for use within the engine 10 described above is generally provided. Various embodiments of the combustion section 26 may further define a rich burn combustor in particular. However, other embodiments may define a lean burn combustor configuration. In the exemplary embodiment, the combustion section 26 includes an annular combustor. However, one skilled in the art will appreciate that the combustor may be any other combustor, including, but not limited to, a single or double annular combustor, a can-combustor, or a can-annular combustor.

As shown in FIG. 2, combustion section 26 includes an outer liner 102 and an inner liner 104 disposed between an outer combustor casing 106 and an inner combustor casing 108. Outer and inner liners 102 and 104 are spaced radially from each other such that a combustion chamber 110 is defined therebetween. Outer liner 102 and outer casing 106 form an outer passage 112 therebetween, and inner liner 104 and inner casing 108 form an inner passage 114 therebetween.

The combustion section 26 may also include a combustor assembly 118 comprising an annular dome assembly 120 mounted upstream of the combustion chamber 110 that is configured to be coupled to the forward ends of the outer and inner liners 102, 104. More particularly, the combustor assembly 118 includes an inner annular dome 122 attached to the forward end of the inner liner 104 and an outer annular dome 124 attached to the forward end of the outer liner 102.

As shown in FIG. 2, the combustion section 26 may be configured to receive an annular stream of pressurized compressor discharge air 126 from a discharge outlet of the high pressure compressor 24. To assist in directing the compressed air, the annular dome assembly 120 may further comprise an inner cowl 128 and an outer cowl 130 which may be coupled to the upstream ends of inner and outer liners 104 and 102, respectively. In this regard, an annular opening 132 formed between inner cowl 128 and outer cowl 130 enables compressed fluid to enter combustion section 26 through a diffuse opening in a direction generally indicated by arrow 134. The compressed air may enter into a cavity 136 defined at least in part by the annular dome assembly 120. In various embodiments, the cavity 136 is more specifically defined between the inner and outer annular domes 122, 124, and the inner and outer cowls 128, 130. As will be discussed in more detail below, a portion of the compressed air in the cavity 136 may be used for combustion, while another portion may be used for cooling the combustion section 26.

In addition to directing air into cavity 136 and the combustion chamber 110, the inner and outer cowls 128, 130 may direct a portion of the compressed air around the outside of the combustion chamber 110 to facilitate cooling liners 102 and 104. For example, as shown in FIG. 2, a portion of the compressor discharge air 126 may flow around the combustion chamber 110, as indicated by arrows 138 and 140, to provide cooling air to outer passage 112 and inner passage 114, respectively.

In certain exemplary embodiments, the inner dome 122 may be formed integrally as a single annular component, and similarly, the outer dome 124 may also be formed integrally as a single annular component. In still certain embodiments, the inner dome 122 and the outer dome 124 may together be formed as a single integral component. In still various embodiments, the dome assembly 120, including one or more of the inner dome 122, the outer dome 124, the outer linter 102, or the inner liner 104, may be formed as a single integral component. It should be appreciated, however, that in other exemplary embodiments, the inner dome 122 and/or the outer dome 124 may alternatively be formed by one or more components joined in any suitable manner. For example, with reference to the outer dome 124, in certain exemplary embodiments, the outer cowl 130 may be formed separately from the outer dome 124 and attached to the forward end of the outer dome 124 using, e.g., a welding process, a mechanical fastener, a bonding process or adhesive, or a composite layup process. Additionally, or alternatively, the inner dome 122 may have a similar configuration.

The combustor assembly 118 further includes a plurality of mixer assemblies 142 spaced along a circumferential direction between the outer annular dome 124 and the inner dome 122. In this regard, a plurality of circumferentially-spaced contoured cups 144 may be formed in the annular dome assembly 120, and each cup 144 defines an opening in which a swirler, cyclone, or mixer assembly 142 is mounted, attached, or otherwise integrated for introducing the air/fuel mixture into the combustion chamber 110. Notably, compressed air may be directed from the combustion section 26 into or through one or more of the mixer assemblies 142 to support combustion in the upstream end of the combustion chamber 110.

A liquid and/or gaseous fuel is transported to the combustion section 26 by a fuel distribution system (not shown), where it is introduced at the front end of a burner in a highly atomized spray from a fuel nozzle. In an exemplary embodiment, each mixer assembly 142 may define an opening for receiving a fuel injector 146 (details are omitted for clarity). The fuel injector 146 may inject fuel in a longitudinal direction (i.e., along longitudinal axis 116 extended from a forward end to an aft end) as well as in a generally radial direction, where the fuel may be swirled with the incoming compressed air. The longitudinal axis 116 corresponds to a centerline of each fuel injector 146 through each corresponding mixer assembly 142. Thus, each mixer assembly 142 receives compressed air from annular opening 132 and fuel from a corresponding fuel injector 146. Fuel and pressurized air are swirled and mixed together by mixer assemblies 142, and the resulting fuel/air mixture is discharged into combustion chamber 110 for combustion thereof.

The combustion section 26 may further comprise an ignition assembly (e.g., one or more igniters extending through the outer liner 102) suitable for igniting the fuel-air mixture. However, details of the fuel injectors and ignition assembly are omitted in FIG. 2 for clarity. Upon ignition, the resulting combustion gases may flow in a generally axial direction (along longitudinal axis 116) through the combustion chamber 110 into and through the turbine section of the engine 10 where a portion of thermal and/or kinetic energy from the combustion gases is extracted via sequential stages of turbine stator vanes and turbine rotor blades. More specifically, the combustion gases may flow into an annular, first stage turbine nozzle 148. As is generally understood, the nozzle 148 may be defined by an annular flow channel that includes a plurality of radially-extending, circularly-spaced nozzle vanes 150 that turn the gases so that they flow angularly and impinge upon the first stage turbine blades (not shown) of the HP turbine 28 (FIG. 1).

Referring still to FIG. 2, the plurality of mixer assemblies 142 are placed circumferentially within the annular dome assembly 120 around the engine 10. Fuel injectors 146 are disposed in each mixer assembly 142 to provide fuel and support the combustion process. Each dome has a heat shield, for example, a deflector assembly 160, which thermally insulates the annular dome assembly 120 from the extremely high temperatures generated in the combustion chamber 110 during engine operation. The inner and outer annular domes 122, 124 and the deflector assembly 160 may define a plurality of openings (e.g., contoured cups 144) for receiving the mixer assemblies 142. As shown the plurality of openings are, in one embodiment, circular. However, it should be appreciated that in other embodiments, the openings are ovular, elliptical, polygonal, oblong, or other non-circular cross sections.

Compressed air (e.g., 126) flows into the annular opening 132 where a portion of the air 126 will be used to mix with fuel for combustion and another portion will be used for cooling the dome deflector assembly 160. Compressed air may flow around the fuel injector 146 and through the mixing vanes around the circumference of the mixing assemblies 142, where compressed air is mixed with fuel and directed into the combustion chamber 110. Another portion of the air enters into a cavity 136 defined by the annular dome assembly 120 and the inner and outer cowls 128, 130. The compressed air in cavity 136 is used, at least in part, to cool the annular dome assembly 120 and the deflector assembly 160.

Referring now to FIGS. 3-9, exemplary embodiments of a flow device 300 for the combustor assembly 118 are provided. The flow device 300 is configured to mitigate undesired combustion dynamics that may result from unstable pressure oscillations or heat release characteristics from the combustion of fuel and air at the combustion chamber 110. Mitigating undesired combustion dynamics may improve durability of combustion section components, reduce maintenance costs, and/or improve combustion dynamics. The flow device 300 includes a body 310 extended around the longitudinal axis 116. The body 310 includes a first wall 311 and a second wall 312 separated along a longitudinal direction L from one another along the longitudinal axis 116. A fuel injector passage 305 is defined through the body 310 coaxial to the longitudinal axis 116. A plurality of vane walls 320 is extended along a radial direction RR relative to the longitudinal axis 116. The plurality of vane walls 320 is positioned in circumferential arrangement relative to the longitudinal axis 116. In various embodiments, the plurality of vane walls 320 is further extended at least partially tangentially relative to the longitudinal axis 116.

The plurality of vane walls 320 is extended between and connected to the first wall 311 and the second wall 312. A flow passage 307 is defined by the plurality of vane walls 320, the first wall 311, and the second wall 312. The flow passage 307 is extended along the radial direction RR is extended between the plurality of vane walls 320 and the fuel injector passage 305. The radial flow passage 307 is further extended along the radial direction RR from the fuel injector passage 305 to the cavity or surrounding volume 136 outward of the body 310 along the radial direction RR relative to the longitudinal axis 116.

In certain embodiments, the flow passage 307 is in direct fluid communication with the fuel injector passage 305. In one embodiment, the fuel injector passage 305 provides an unobstructed flow of fluid, such as free of radial walls extended inward of an opening 308. In various embodiments, the opening 308 provided through the first wall 311, such as further shown and described in regard to FIGS. 3-9, may provide desired purge flows, mitigate unsteady flow characteristics, mitigate hydrodynamic instability modes, and/or reduce axial (e.g., along the centerline axis 116) oscillatory modes when a first flow of fluid through the fuel injector passage 305 is introduced with a second flow of fluid toward the fuel injector passage 305 from the radial flow passage 307. In certain embodiments, such as provided herein, the opening 308 may provide one or more such improvements over flow devices only containing axially extended flow orifices. In still various embodiments such as provided herein, a substantially radial flow of oxidizer is provided through the flow passage 307 upstream of one or more flows of oxidizer through one or more mixer assemblies 142 axially forward of the flow passage 307. In certain embodiments, the substantially radial flow of oxidizer from the flow passage 307 is a substantially straight or non-swirled radial flow. In still certain embodiments, the substantially straight or non-swirled radial flow from the flow passage 307 is provided fluid and aerodynamic communication with a substantially axial flow of oxidizer through the fuel injector passage 305.

In one embodiment, the body 310 further includes a third wall 313 separated along the longitudinal direction L from the second wall 312 along the first injector centerline axis 116. The mixer assembly 142 is positioned between the second wall 312 and the third wall 313. The mixer assembly 142 includes a plurality of radially oriented vanes 321 extended between the second wall 312 and the third wall 313. The radially oriented vanes 321 are extended along the radial direction RR relative to the longitudinal axis 116. The mixer assembly 142 defines a mixer flow passage 317 extended along the radial direction RR relative to the longitudinal axis 116. Referring more particularly to the cutaway longitudinal perspective view provided in FIG. 6, in one embodiment, the mixer flow passage 317 extend along the radial direction RR and the longitudinal direction L relative to the longitudinal axis 116. In various embodiments, a second mixer flow passage 317a is extended radially and longitudinally relative to the longitudinal axis 116 such as to extend the second mixer flow passage 317a at least partially along the longitudinal direction L and surrounding the fuel injector passage 305. Referring briefly to FIG. 2, the fuel injector 146 is disposed radially inward of the mixer flow passage 317.

In various embodiments, the first wall 311, the second wall 312, and the third wall 313 are each in serial arrangement along the longitudinal direction L (i.e., adjacent or next to one another co-directional to the longitudinal axis 116). The mixer assembly 142 is defined aft of the first wall 311 (i.e., proximate to an aft end 98 depicted in FIGS. 3, 5-6) along the longitudinal direction L such as to position the radial flow passage 307 forward or upstream of the mixer assembly 142 along the longitudinal direction L.

The plurality of vane walls 320 is configured to provide a flow of fluid, such as air or an oxidizer generally depicted via arrows 407, through the radial flow passage 307 from the surrounding volume 136 to the fuel injector passage 305. In various embodiments, with the fuel injector 146 (FIG. 2) installed and positioned in the fuel injector passage 305, the flow of fluid 407 is provided from the volume 136 to the fuel injector passage 305 radially outward of the fuel injector 146. The radial flow passage 307 is configured to attenuate or mitigate undesired combustion dynamics via the flow of fluid 407 through the flow passage 307 positioned forward of the mixer assembly 142 and interacting with an axial flow of fluid 408 at the fuel injector passage 305.

Referring to FIGS. 3-9, in various embodiments, the flow passage 307 extended between each pair of vane walls 320 is in direct fluid communication with the fuel injector passage 305. Referring to the perspective view provided in FIG. 3 and the cutaway flowpath view in FIG. 4, in one embodiment, the flow passage 307 is extended along the radial direction RR and cut partially through the first wall 311. For example, referring to FIG. 4, the flow passage 307 includes an opening 308 cut along the radial direction RR into the first wall 311 such as to enable flow along the longitudinal direction L, such as depicted at volume 309.

Figure 3:
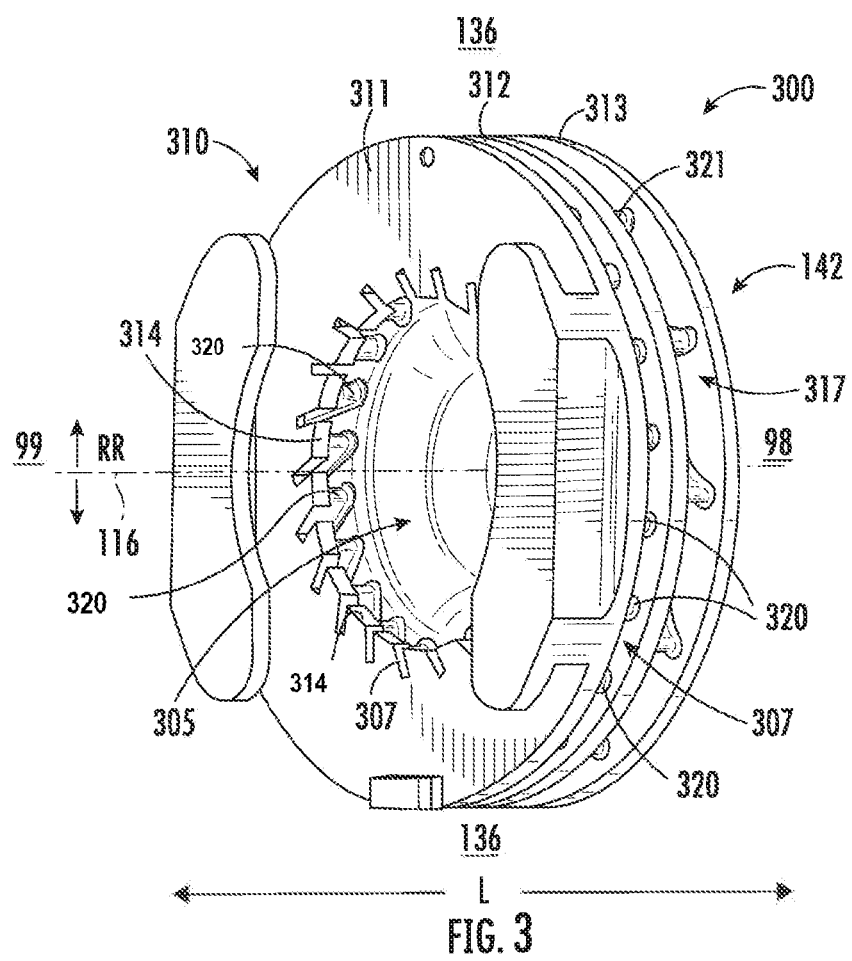
FIG. 3 is a perspective view of an exemplary embodiment of a flow device according to an aspect of the present disclosure.
Figure 4:
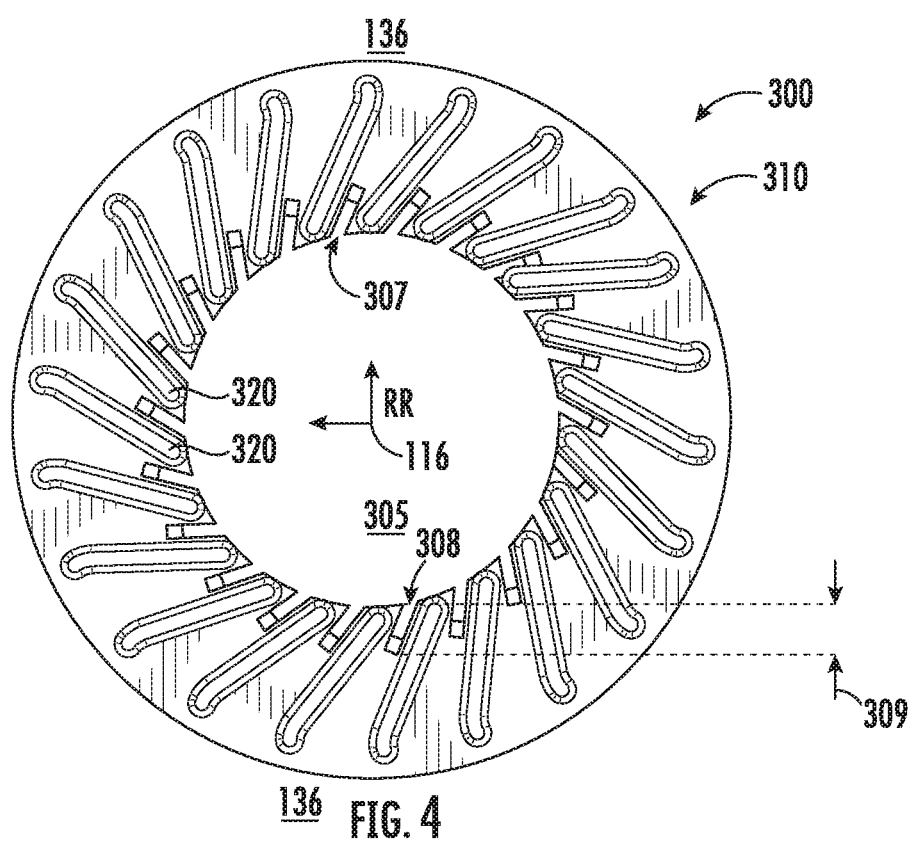
FIG. 4 is a cutaway flowpath view of the flow device of FIG. 3.
Figure 5:
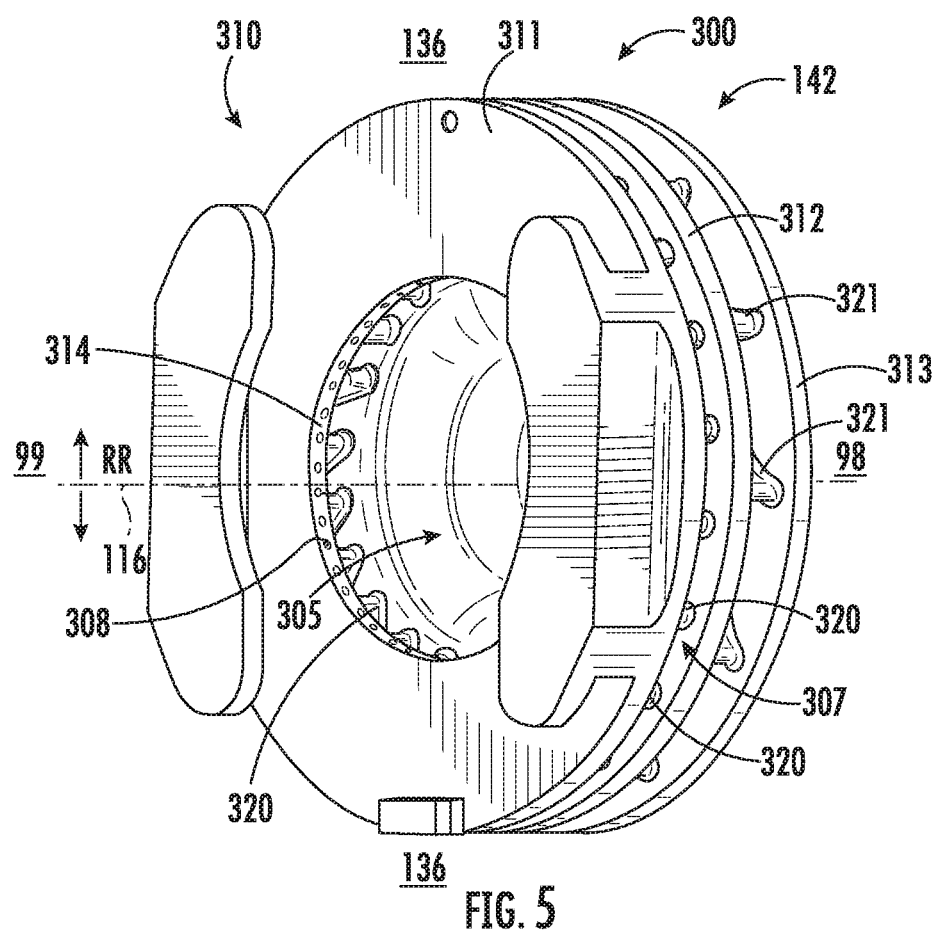
FIG. 5 is a perspective view of another exemplary embodiment of a flow device according to an aspect of the present disclosure.
Figure 6:
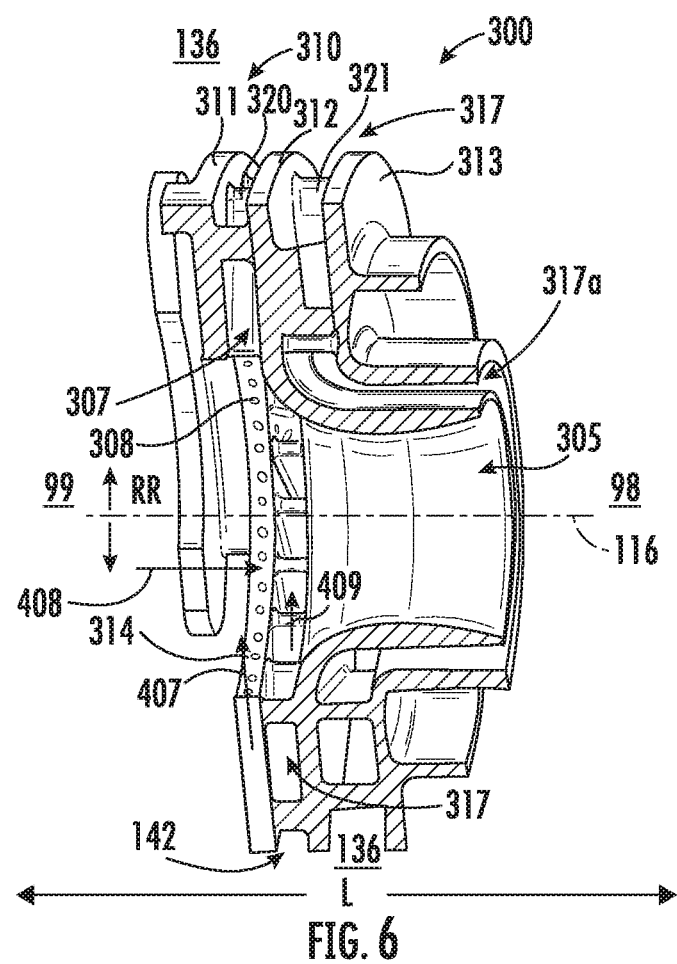
FIG. 6 is a cutaway perspective view of the exemplary flow device of FIG. 5.

Referring to FIGS. 3-9, in another embodiment, a radially inward end of the flow passage 307 is in direct fluid communication with the fuel injector passage 305 via the opening 308. A fourth wall 314 is extended circumferentially relative to the longitudinal axis 116 and radially inward of the vane walls 320. Referring to FIGS. 5-6, the fourth wall 314 is connected to each vane wall 320 and the opening 308 is defined through the fourth wall 314 such as to provide direct fluid communication between the flow passage 307 and the fuel injector passage 305.

Referring back to FIGS. 3-9, the opening 308 is extended inward along the radial direction RR from the fuel injector passage 305 at least partially along a distance of the radial flow passage 307, such as depicted at volume 309 in FIG. 4.

Referring to FIGS. 3-4, the opening 308 is extended along the longitudinal direction L through the first wall 311.

Referring to FIGS. 3-4, the opening 308 defines a generally polygonal cross-sectional area through the first wall 311. In other embodiments, such as depicted in regard to FIGS. 5-6, the opening 308 defines a generally circular cross-sectional area through the first wall 311.

Figure 7:
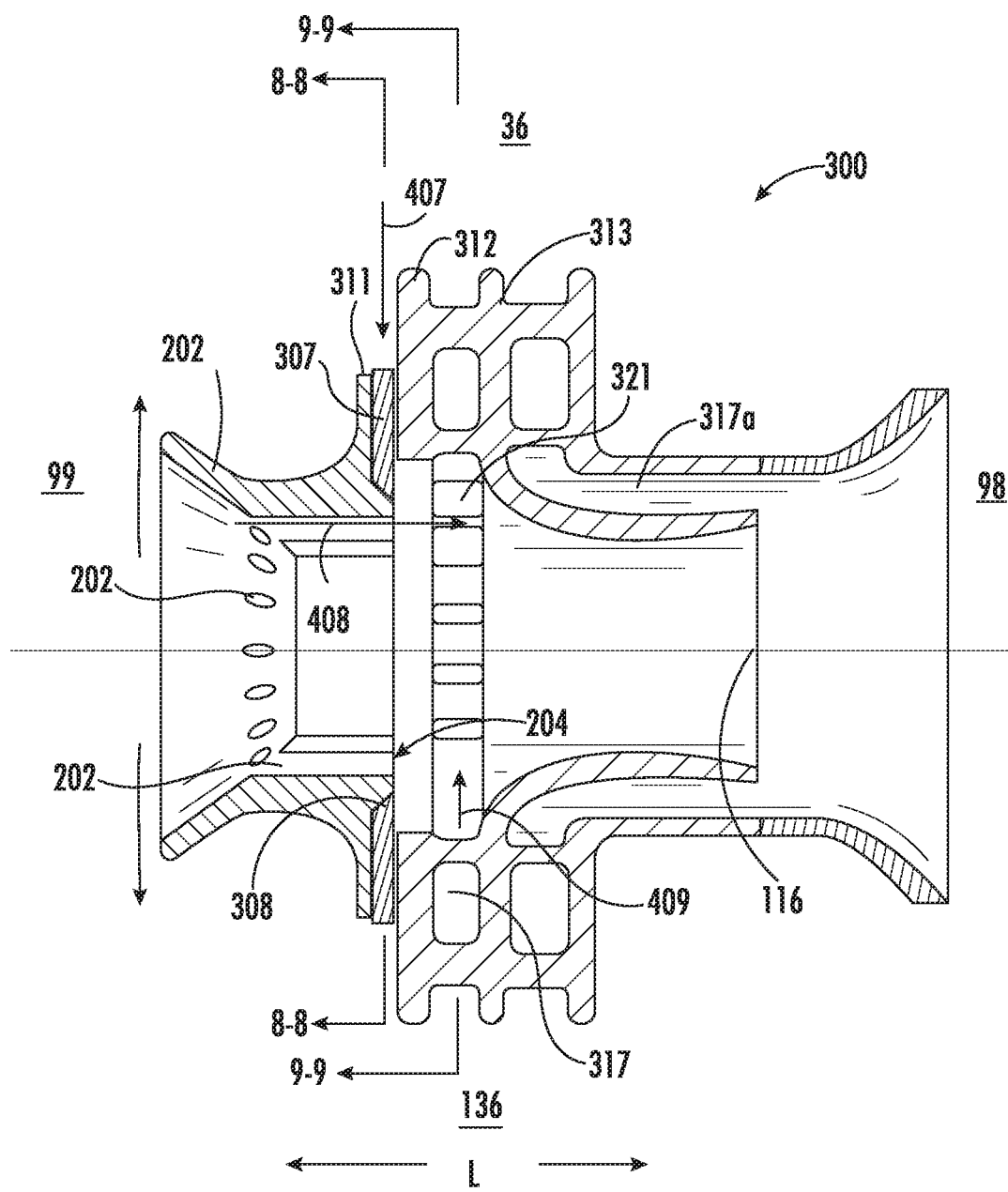
FIG. 7 is a cutaway side view of an exemplary flow device according to an aspect of the present disclosure.
Figure 8:
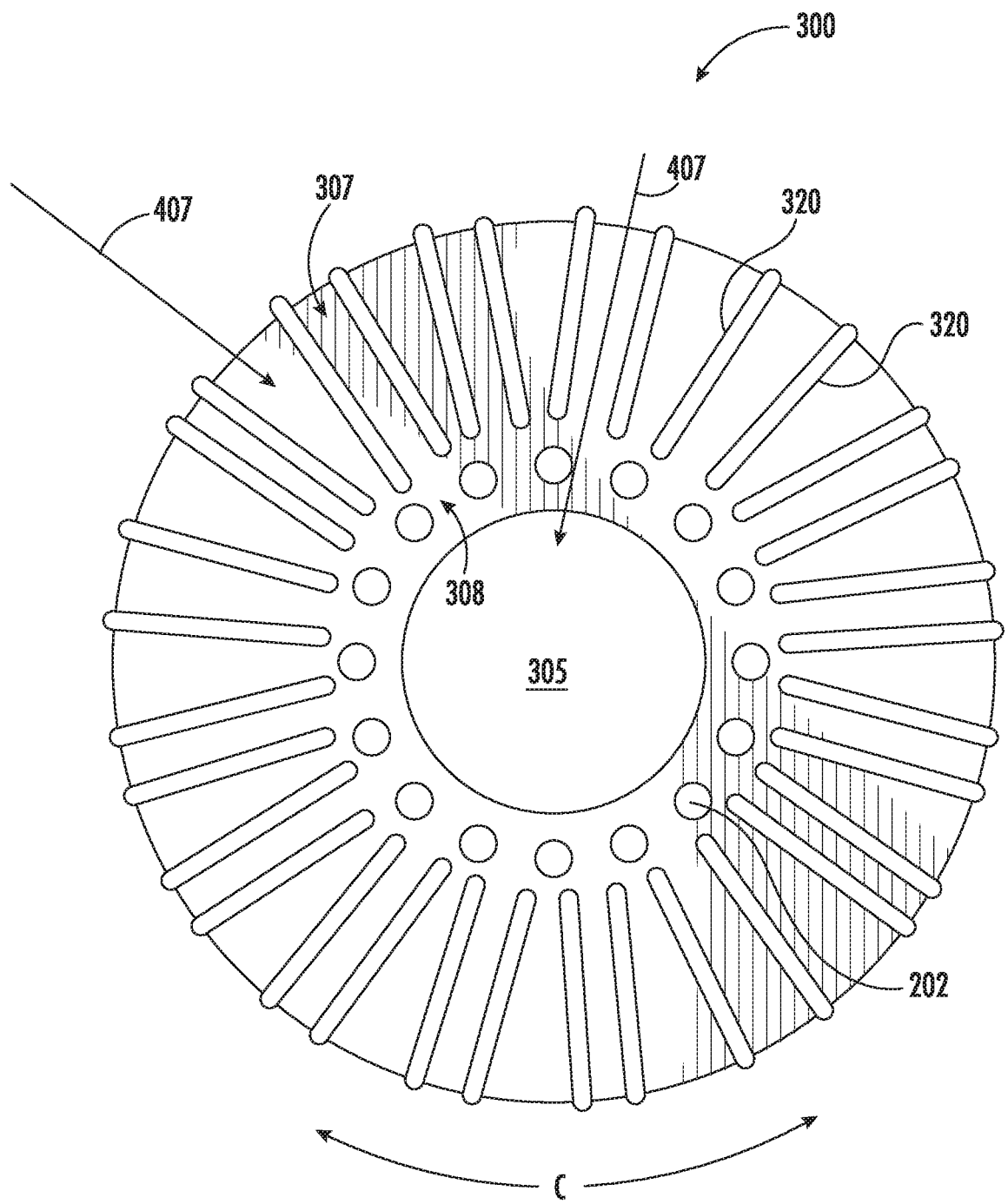
FIG. 8 is a circumferential cross sectional view of an exemplary portion of the flow device of FIG. 7 at plane 8-8.
Figure 9:
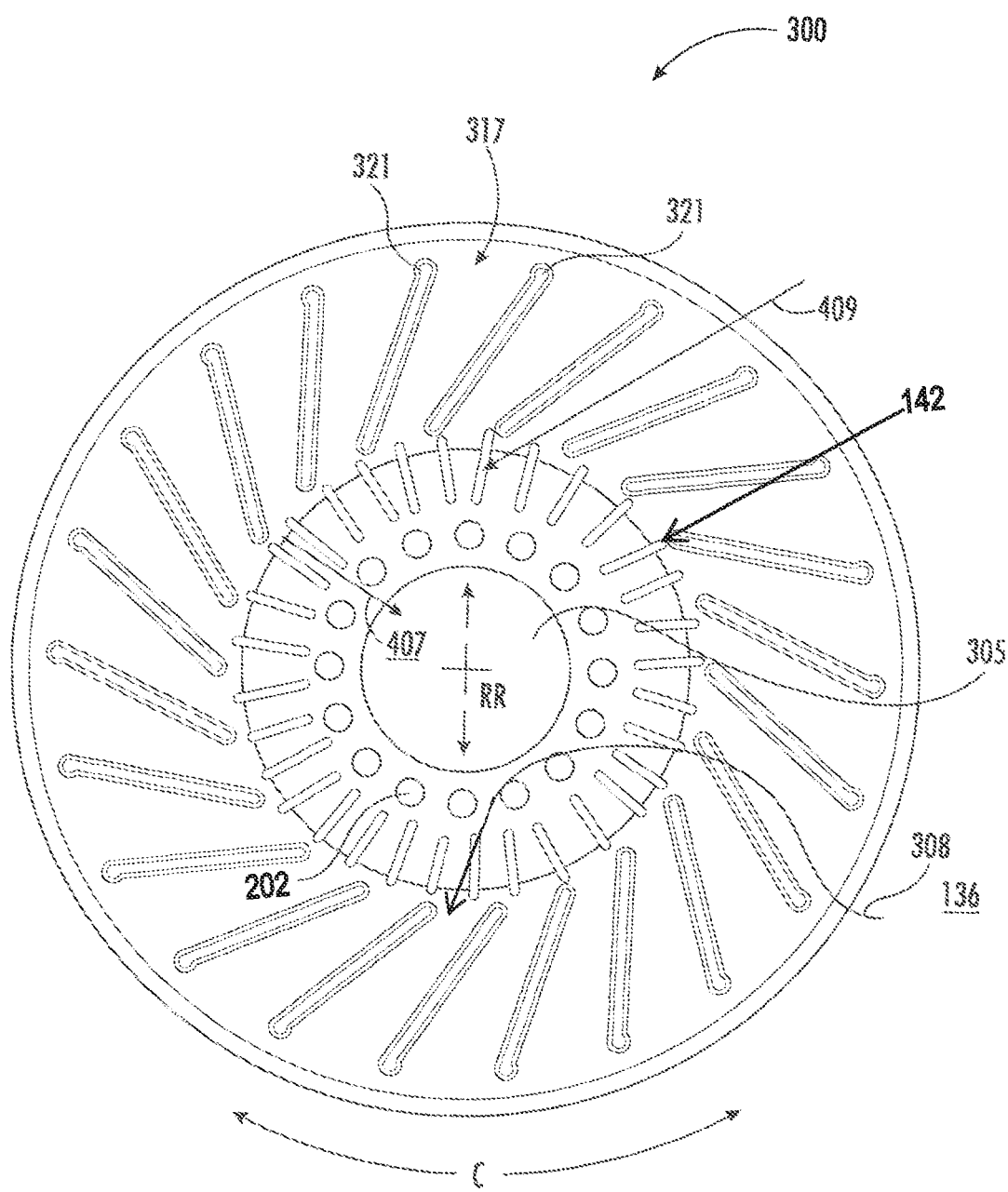
FIG. 9 is a circumferential cross sectional view of an exemplary portion of the flow device of FIG. 7 at plane 9-9.

Referring now to FIGS. 7-9, further embodiments of the flow device 300 are generally provided. The embodiments provided in regard to FIGS. 7-9 are configured substantially similarly as shown and described in regard to FIGS. 3-6. Referring to FIG. 7, a substantially axial flow ferrule 200 is positioned forward or upstream of the flow passage 307 and mixer assembly 142. It should be appreciated that the axial flow ferrule 200 shown and described in regard to FIG. 7 can further be included with one or more embodiments shown and described in regard to FIGS. 1-6. As such, various embodiments of the flow device 300 provided herein may exclude the axial flow ferrule 200 for clarity.

Referring still to FIG. 7, in certain embodiments, the flow passage 307 is defined as a substantially straight or non-swirled passage extended along the radial direction RR in fluid communication with the fuel injector passage 305. A flow of fluid 408 is provided from one or more axially extended ports 202 at the axial flow ferrule 200. The one or more axially extended ports 202 is positioned and extended generally forward or upstream along the longitudinal direction L of the mixer assembly 142.

Referring now to FIG. 8, an exemplary circumferential cross sectional view of the flow device 300 in FIG. 7 along plane 8-8 is generally provided. Referring further to FIG. 9, an exemplary circumferential cross sectional view of the flow device 300 in FIG. 7 along plane 9-9 is generally provided. A circumferential direction C relative to the longitudinal axis 116 is defined. The embodiment in FIG. 8 depicts the vane walls 320 extended substantially along the radial direction RR such that a flow of oxidizer, depicted via arrows 407, is provided substantially radially straight through the flow passage 307. The flow 407 is further mixed with a substantially axial flow of oxidizer at the fuel injector passage 305, such as depicted via arrows 408 in FIG. 7. Referring to FIG. 9, an at least partially circumferentially or tangentially swirled flow of oxidizer, depicted via arrows 409, is provided through the mixer flow passage 317 of the mixer assembly 142.

Referring to FIGS. 7-9, and generally in regard to embodiments shown and described in regard to FIGS. 1-6, in certain embodiments the opening 308 is positioned at a radially downstream end of the flow passage 307 proximate to a longitudinally downstream end 204 of the axially extended port 202 of the axial flow ferrule 200. In some embodiments, the opening 308 is positioned radially outward of the longitudinally downstream end 204 of the port 202 at the axial flow ferrule 200. Additionally, or alternatively, the opening 308 is positioned radially outward and longitudinally downstream of the downstream end 204 of the port 202 at the axial flow ferrule 200. In still various embodiments, the flow of oxidizer 407 from the flow passage 307 encounters the flow of oxidizer 408 at the fuel injector passage 305 longitudinally upstream of the flow of oxidizer 409 from the mixer flow passage 317. The mixture of flows 407, 408 upstream of the flow of oxidizer 409 may beneficially attenuate undesired instability modes or flow features, such as further described herein.

In various embodiments of the flow device 300 depicted in regard to FIGS. 3-9, the flow passage 307 is defined forward of the mixer assembly 142, such as forward (i.e., at forward end 99 opposite of aft end 98 depicted in FIGS. 3, 5-6) of the second wall 312 and the third wall 313 at which the mixer assembly 142 is defined. The radial flow passage 307 provides the flow of oxidizer 407 radially inward to the fuel injector passage 305 from longitudinally forward of the radially oriented vanes 321 of the mixer assembly 142 such as to eliminate or mitigate axial or longitudinal motion of a combustor central recirculation zone (CRZ). The vane walls 320 defining the radial flow passage 307 provide effective purging of radially oriented vanes 321 while reducing or eliminating unsteady flow features and hydrodynamic instability modes. The vane walls 320 are further, or alternatively, effective for reducing axial oscillatory modes, such as due to the flow of oxidizer 408 passing along a substantially axial direction through the fuel injector passage 305 (e.g., from the axial flow ferrule 200) from the compressors to the combustion chamber 110 via the flow device 300.

In still various embodiments, the flow device 300 may be particularly effective for rich burn combustion sections. Embodiments of the combustion section 26 provided herein may include full or partial annular combustor assemblies, can combustors, can-annular combustors, or other combustion assembly configurations. However, it should be appreciated that features and arrangements shown and described herein may be adapted to other combustion section configurations, such as, but not limited to, lean-burn combustors. It should further be appreciated that features and arrangements shown and described herein, such as the serial arrangement of the radially oriented vane walls 320 forward or upstream of the mixer assembly 142 and combustion chamber 110, and/or the radially oriented vane walls 320 positioned radially outward of the fuel injector 146 such as to provide a flow of fluid upstream of the mixer assembly 142 and radially outward of the fuel injector 146, may be adapted to inter-turbine burners, or augmentor/after-burner assemblies.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A flow device for a combustor assembly, the flow device comprising a body extended around a longitudinal axis, wherein the body comprises a first wall and a second wall separated longitudinally from one another along the longitudinal axis, and wherein a fuel injector passage is defined through the body coaxial to the longitudinal axis, and further wherein a plurality of vane walls is extended radially between the first wall and the second wall relative to the longitudinal axis, and wherein a radial flow passage is extended between the plurality of vane walls and the fuel injector passage, and wherein an opening is defined at least partially through one or more vane walls in fluid communication with the radial flow passage.

The flow device of any preceding clause, wherein the opening is extended radially from the fuel injector passage at least partially along a distance of the radial flow passage.

The flow device of any preceding clause, wherein the opening is extended longitudinally through the first wall.

The flow device of any preceding clause, wherein the opening is a circular or polygonal cross section through the first wall.

The flow device of any preceding clause, wherein the radial flow passage is extended along a radial direction relative to the longitudinal axis from the fuel injector passage to a surrounding area radially outward of the body.

The flow device of any preceding clause, wherein the body further comprises a third wall separated longitudinally from the second wall along the first injector centerline axis, wherein a mixer assembly is positioned between the second wall and the third wall, the mixer assembly comprising a plurality of radially oriented vanes.

The flow device of any preceding clause, wherein the mixer assembly defines a mixer flow passage extended radially, longitudinally, or both relative to the longitudinal axis.

The flow device of any preceding clause, wherein the plurality of vane walls is in circumferential arrangement relative to the longitudinal axis.

The flow device of any preceding clause, wherein the opening is defined through the first wall in fluid communication with the radial flow passage, and wherein the opening is extended radially from the fuel injector passage at least partially along a distance of the radial flow passage.

The flow device of any preceding clause, wherein the plurality of vane walls is extended at least partially tangentially relative to the longitudinal axis.

A combustor assembly for a combustion section, the combustor assembly defining a longitudinal axis along which a fuel injector is positioned, the combustor assembly comprising a flow device of any preceding clause extended around the longitudinal axis, wherein the flow device comprises a first wall and a second wall separated longitudinally from one another along the longitudinal axis, and wherein a fuel injector passage is defined through the flow device coaxial to the longitudinal axis, and further wherein a plurality of vane walls is extended radially between the first wall and the second wall relative to the longitudinal axis, and wherein a radial flow passage is extended between the plurality of vane walls and the fuel injector passage, and further wherein an opening is defined at least partially through one or more vane walls in fluid communication with the radial flow passage.

The combustor assembly of any preceding clause, wherein the opening is defined through the first wall in direct fluid communication with the radial flow passage.

The combustor assembly of any preceding clause, wherein the opening is extended radially from the fuel injector passage at least partially along a distance of the radial flow passage.

The combustor assembly of any preceding clause, wherein the opening is extended longitudinally through the first wall.

The combustor assembly of any preceding clause, wherein the radial flow passage is extended along a radial direction relative to the longitudinal axis from the fuel injector passage to a surrounding area radially outward of the flow device.

The combustor assembly of any preceding clause, wherein the flow device further comprises a third wall separated longitudinally from the second wall along the first injector centerline axis, wherein a plurality of radially oriented vanes defining a fuel/air mixer assembly is positioned between the second wall and the third wall.

The combustor assembly of any preceding clause, wherein a mixer flow passage is extended radially and longitudinally relative to the longitudinal axis between the second wall, the third wall, and the plurality of radially oriented vanes.

The combustor assembly of any preceding clause, wherein the first wall, the second wall, and the third wall are each in serial arrangement along the longitudinal direction.

The combustor assembly of any preceding clause, further comprising a fuel injector positioned in the fuel injector passage, wherein the plurality of vane walls is configured to provide a flow of fluid through the radial flow passage from a surrounding area radially outward of the flow device to the fuel injector passage.

A heat engine comprising the combustor assembly and the flow device of any preceding clause.

What is claimed is:

1. A flow device for a combustor assembly, the flow device comprising:
a body extended around a longitudinal axis, wherein the body comprises a first wall and a second wall separated longitudinally from one another along the longitudinal axis, and wherein a fuel injector passage is defined through the body coaxial to the longitudinal axis, and further wherein a plurality of vane walls is extended radially between the first wall and the second wall relative to the longitudinal axis, the plurality of vane walls being extended between and connected to the first wall and the second wall, and wherein a radial flow passage is extended between the plurality of vane walls and the fuel injector passage, the radial flow passage being defined by the plurality of vane walls, the first wall, and the second wall, and wherein an opening is defined at least partially through at least the first wall, the opening being in fluid communication with the radial flow passage and the opening extending radially from the fuel injector passage at least partially along a distance of the radial flow passage, such that the opening starts at an edge of the fuel injector passage and extends radially therefrom.

2. The flow device of claim 1, wherein the opening is extended longitudinally through the first wall.

3. The flow device of claim 1, wherein the opening is a circular or polygonal cross section through the first wall.

4. The flow device of claim 1, wherein the radial flow passage is extended along a radial direction relative to the longitudinal axis from the fuel injector passage to a surrounding area radially outward of the body.

5. The flow device of claim 4, wherein the body further comprises a third wall separated longitudinally from the second wall along the longitudinal axis, wherein a mixer assembly is positioned between the second wall and the third wall, the mixer assembly comprising a plurality of radially oriented vanes.

6. The flow device of claim 5, wherein the mixer assembly defines a mixer flow passage extended radially, longitudinally, or both relative to the longitudinal axis.

7. The flow device of claim 1, wherein the plurality of vane walls is in circumferential arrangement relative to the longitudinal axis.

8. The flow device of claim 1, wherein the plurality of vane walls is extended at least partially tangentially relative to the longitudinal axis.

9. A combustor assembly for a combustion section, the combustor assembly defining a longitudinal axis along which a fuel injector is positioned, the combustor assembly comprising:
a flow device extended around the longitudinal axis, wherein the flow device comprises a first wall and a second wall separated longitudinally from one another along the longitudinal axis, and wherein a fuel injector passage is defined through the flow device coaxial to the longitudinal axis, and further wherein a plurality of vane walls is extended radially between the first wall and the second wall relative to the longitudinal axis, the plurality of vane walls being extended between and connected to the first wall and the second wall, and wherein a radial flow passage is extended between the plurality of vane walls and the fuel injector passage, the radial flow passage being defined by the plurality of vane walls, the first wall, and the second wall, and further wherein an opening is defined at least partially through at least the first wall, the opening being in fluid communication with the radial flow passage and the opening extending radially from the fuel injector passage at least partially along a distance of the radial flow passage, such that the opening starts at an edge of the fuel injector passage and extends radially therefrom.

10. The combustor assembly of claim 9, wherein the opening is defined through the first wall in direct fluid communication with the radial flow passage.

11. The combustor assembly of claim 9, wherein the opening is extended longitudinally through the first wall.

12. The combustor assembly of claim 9, wherein the radial flow passage is extended along a radial direction relative to the longitudinal axis from the fuel injector passage to a surrounding area radially outward of the flow device.

13. The combustor assembly of claim 12, wherein the flow device further comprises a third wall separated longitudinally from the second wall along the longitudinal axis, wherein a plurality of radially oriented vanes defining a fuel/air mixer assembly is positioned between the second wall and the third wall.

14. The combustor assembly of claim 13, wherein a mixer flow passage is extended radially and longitudinally relative to the longitudinal axis between the second wall, the third wall, and the plurality of radially oriented vanes.

15. The combustor assembly of claim 13, wherein the first wall, the second wall, and the third wall are each in serial arrangement along the longitudinal axis.

16. The combustor assembly of claim 9, further comprising:
a fuel injector positioned in the fuel injector passage, wherein the plurality of vane walls is configured to provide a flow of fluid through the radial flow passage from a surrounding area radially outward of the flow device to the fuel injector passage.

17. A heat engine comprising the combustor assembly of claim 9.

* * * * *